June 29, 1926.
J. FRITZ
1,590,970
APPARATUS FOR MEASURING ELECTRIC CURRENTS
Filed Feb. 9, 1924
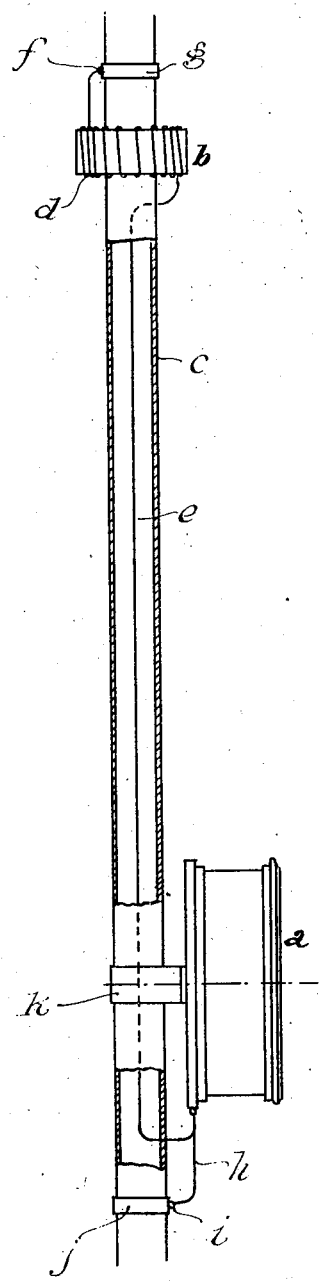

Patented June 29, 1926.

1,590,970

UNITED STATES PATENT OFFICE.

JOSEF FRITZ, OF DRESDEN-STREHLEN, GERMANY, ASSIGNOR TO SACHSENWERK, LICHT- UND KRAFT-AKTIENGESELLSCHAFT, OF NIEDERSEDLITZ, N./DRESDEN, ONY, GERMANY.

APPARATUS FOR MEASURING ELECTRIC CURRENTS.

Application filed February 9, 1924, Serial No. 691,805, and in Germany December 24, 1923.

Heretofore it has been customary to arrange high tension current-indicators either directly into the circuit, or to connect them in switch-plants for intense short-circuit-currents, to transformers by a grounded low-tension winding.

Current indicators directly arranged into the circuit have the disadvantage that they are easily damaged by short-circuit-currents. In addition to this electric arcs are often formed causing still further damage to the apparatus in the line.

The use of short-circuit proof transformers with separate low-tension winding in connection with high voltage is a very expensive apparatus.

Now, the object of the present invention is the provision of a measuring apparatus which is short-circuit proof and, at the same time, of a very cheap and simple construction.

The drawing shows in a diagrammatic sectional elevation one embodiment of my invention.

This apparatus consists of a current indicator $a$ and a current-transformer coil $b$ neither of which is grounded but both of which are directly connected to the high tension line $c$. As indicated in the drawing, this high tension line $c$ is a tubular conductor. It will be understood however, that the invention is not limited to this type of conductor as it may be utilized with a solid conductor. The transformer coil $b$ is wound with turns $d$ of the indicator line $e$ which at one end is connected to a terminal $f$ on a collar $g$ carried by and electrically connected to the high tension line $c$, indicator line $e$ being carried through the hollow high tension line $a$, and at its other end connected to one of the terminals of the ampere meter $a$. The other terminal of the ampere meter $a$ is connected by an indicator line $h$ which terminates at a contact $i$ carried by a collar $j$. Electrically connected to the high tension line $c$ also as indicated in the drawing, the ampere meter $a$ may be mounted on an insulating collar or bracket $k$ carried by the high tension line $c$. It will be obvious however, that in instances where the invention is applied with high tension lines not sufficiently strong to support the ampere meter and the transformer coil that these members may be suitably mounted on any adequate support in conjunction with the high tension line.

The mode of operation of the apparatus described is the same as that of a short-circuit proof connecting current transformer with an ampere meter. The difference between them consists in dispensing with the expensive insulation otherwise necessary between the transformer coil $b$ and the high-tension line, which insulation had to be measured or defined for the total working-voltage in the construction as heretofore used.

I claim as my invention:

1. An apparatus for measuring electric currents comprising a high tension line, a current indicator, a transformer core associated with the high tension line, and a conductor connected at its ends to the high tension line passing around the said transformer core and with which conductor the said current indicator is connected.

2. An apparatus for measuring electric currents comprising a hollow high tension line, an ampere meter, a transformer core on the high tension line, and a conductor connected at its ends to the high tension line at spaced points having a portion passing around the said transformer core and with which conductor the said ampere meter is connected.

3. An apparatus for measuring electric currents comprising a hollow high tension line, an ampere meter, a support of insulating material carried by the high tension line and upon which the said ampere meter is mounted, a transformer core surrounding the said high tension line and an indicator conductor secured at its ends to the high tension line at spaced points having a portion thereof surrounding the said transformer core, a portion thereof lying within the said high tension line and with which the said ampere meter is connected.

In testimony, that I claim the foregoing as my invention I have signed my name.

JOSEF FRITZ.